(12) United States Patent
Huang

(10) Patent No.: US 9,229,536 B2
(45) Date of Patent: Jan. 5, 2016

(54) SYSTEMS AND METHODS FOR GESTURE RECOGNITION FOR INPUT DEVICE APPLICATIONS

(71) Applicant: BBY SOLUTIONS, INC., Richfield, MN (US)

(72) Inventor: Andrew Shane Huang, Singapore (SG)

(73) Assignee: BBY SOLUTIONS, INC., Richfield, MN (US)

( * ) Notice: Subject to any disclaimer, the term of this patent is extended or adjusted under 35 U.S.C. 154(b) by 34 days.

(21) Appl. No.: 14/305,757

(22) Filed: Jun. 16, 2014

(65) Prior Publication Data
US 2014/0294244 A1    Oct. 2, 2014

Related U.S. Application Data

(63) Continuation of application No. 12/504,614, filed on Jul. 16, 2009, now Pat. No. 8,773,352.

(60) Provisional application No. 61/081,338, filed on Jul. 16, 2008.

(51) Int. Cl.
| | |
|---|---|
| G06F 3/033 | (2013.01) |
| G06F 3/01 | (2006.01) |
| G09G 5/00 | (2006.01) |
| G06T 7/20 | (2006.01) |
| H04N 5/33 | (2006.01) |
| H04N 5/372 | (2011.01) |
| H04N 5/374 | (2011.01) |

(52) U.S. Cl.
CPC ............. G06F 3/017 (2013.01); G06F 3/033 (2013.01); G06T 7/20 (2013.01); G09G 5/00 (2013.01); H04N 5/33 (2013.01); H04N 5/372 (2013.01); H04N 5/374 (2013.01)

(58) Field of Classification Search
None
See application file for complete search history.

(56) References Cited

U.S. PATENT DOCUMENTS

| | | | |
|---|---|---|---|
| 8,773,352 B1 * | 7/2014 | Huang | 345/156 |
| 2004/0125222 A1 * | 7/2004 | Bradski et al. | 348/272 |
| 2008/0062123 A1 * | 3/2008 | Bell | 345/156 |
| 2008/0150913 A1 | 6/2008 | Bell et al. | |
| 2008/0285807 A1 | 11/2008 | Lee et al. | |
| 2009/0262070 A1 * | 10/2009 | Wilson | 345/156 |
| 2009/0286601 A1 * | 11/2009 | Rubio et al. | 463/36 |
| 2009/0315740 A1 * | 12/2009 | Hildreth et al. | 341/20 |
| 2010/0201812 A1 | 8/2010 | Mcgibney et al. | |
| 2010/0289885 A1 | 11/2010 | Lu et al. | |

OTHER PUBLICATIONS

"U.S. Appl. No. 12/504,614, Response filed Dec. 19, 2013 to Final Office Action mailed Jul. 12, 2013", 16 pgs.
"U.S. Appl. No. 12/504,614, Final Office Action mailed Jul. 12, 2013", 18 pgs.
"U.S. Appl. No. 12/504,614, Non Final Office Action mailed Dec. 11, 2012", 17 pgs.
"U.S. Appl. No. 12/504,614, Notice of Allowance mailed Feb. 28, 14", 9 pgs.
"U.S. Appl. No. 12/504,614, Response filed Apr. 18, 2013 to Non Final Office Action mailed Dec. 11, 2012", 13 pgs.

* cited by examiner

*Primary Examiner* — Adam R Giesy
*Assistant Examiner* — Henok Heyi
(74) *Attorney, Agent, or Firm* — Schwegman Lundberg & Woessner, P.A.

(57) ABSTRACT

Systems and methods for gesture recognition for input device applications are described. In one embodiment, a system for gesture recognition includes a pair of IR LED emitters, an imaging module such as a camera or other imaging device, an LED emitter control module and a processing module. The IR LEDs generate IR light to highlight a target from one or more angles, and the received images are processed to identify target position and/or motion to provide output data based on the determined target position and/or motion.

28 Claims, 7 Drawing Sheets

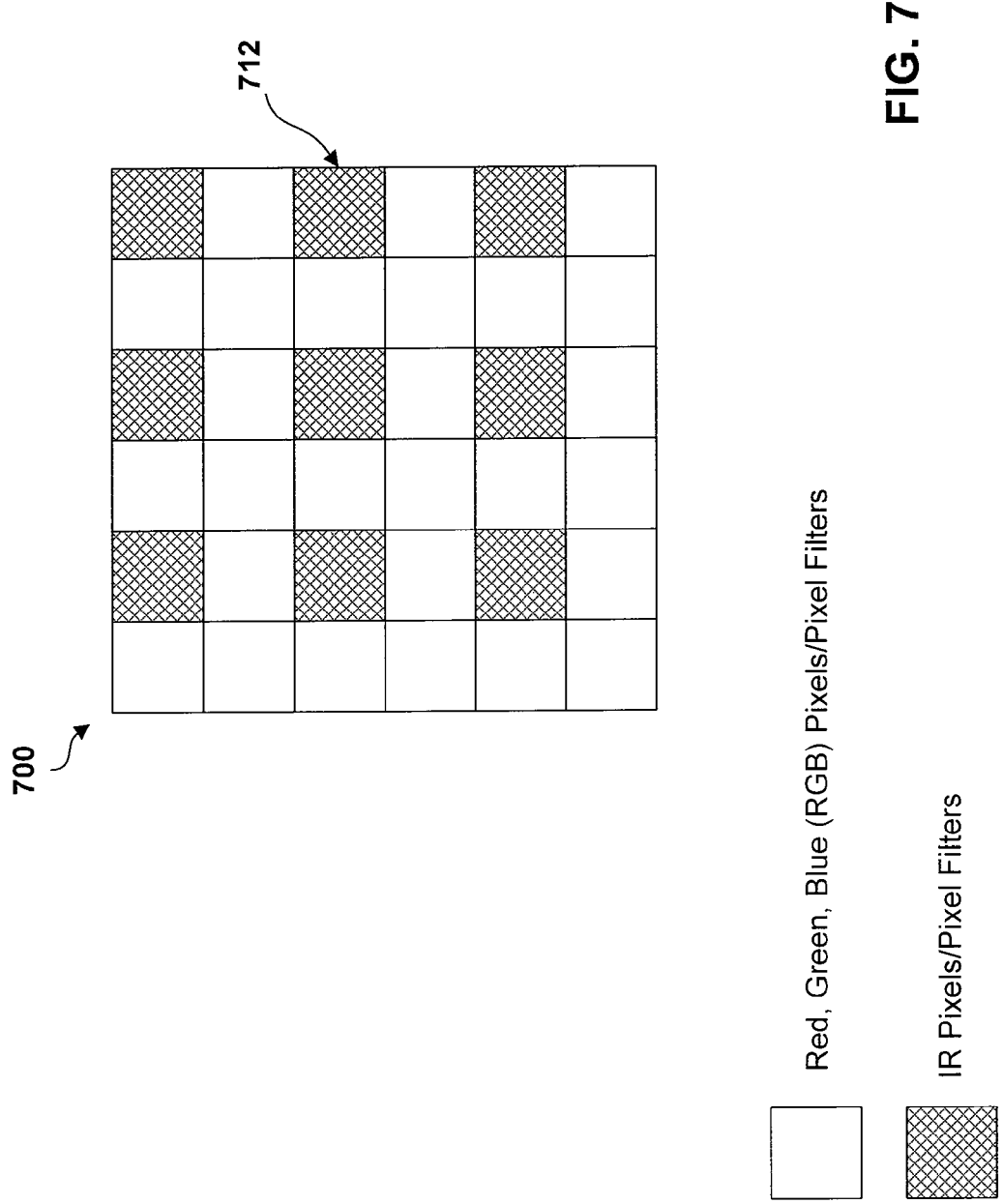

ns priority under 35 U.S.C. §119(e) to
SYSTEMS AND METHODS FOR GESTURE RECOGNITION FOR INPUT DEVICE APPLICATIONS

CROSS-REFERENCE TO RELATED APPLICATIONS

This application claims priority under 35 U.S.C. §119(e) to U.S. Provisional Patent Application Ser. No. 61/081,338, entitled SYSTEMS AND METHODS FOR GESTURE RECOGNITION FOR INPUT DEVICE APPLICATIONS, filed on Jul. 16, 2008. This application is related to U.S. Utility patent application Ser. No. 12/172,893, entitled SYSTEMS AND METHODS FOR ALARM TONE SELECTION, DISTRIBUTION, AND PLAYBACK IN A NETWORKED AUDIOVISUAL DEVICE, filed on Jul. 14, 2008, to U.S. Utility patent application Ser. No. 12/144,561, entitled SYSTEMS AND METHODS FOR INTERACTION WITH VIRTUAL WORLDS USING A PORTABLE DEVICE, filed on Jun. 23, 2008, to U.S. Utility patent application Ser. No. 12/142,630, entitled SYSTEMS AND METHODS FOR DEVICE REGISTRATION, filed on Jun. 19, 2008, to U.S. Utility patent application Ser. No. 12/131,809, entitled SECURITY AND AUTHENTICATION SYSTEMS AND METHODS FOR PERSONALIZED PORTABLE DEVICES AND ASSOCIATED SYSTEMS, filed on Jun. 2, 2008, to U.S. Utility patent application Ser. No. 11/953,756, entitled SYSTEMS AND METHODS FOR LOCATION, MOTION, AND CONTACT DETECTION AND TRACKING IN A NETWORKED AUDIOVISUAL DEVICE, filed Dec. 10, 2007, to U.S. Utility patent application Ser. No. 11/845,027, entitled SYSTEM AND METHOD FOR AUTOMATICALLY UPDATING THE SOFTWARE OF A NETWORKED PERSONAL AUDIOVISUAL DEVICE, filed Aug. 24, 2007, to U.S. Utility patent application Ser. No. 11/845,026, entitled SYSTEM AND METHOD FOR TRANSFERRING ELECTRONIC CONTENT TO NETWORKED PERSONAL AUDIOVISUAL DEVICES, filed Aug. 24, 2007, to U.S. Utility patent application Ser. No. 11/845,021, entitled NETWORKED PERSONAL AUDIOVISUAL DEVICE HAVING FLEXIBLE HOUSING, filed Aug. 24, 2007, to U.S. Utility patent application Ser. No. 11/845,018, entitled CONFIGURABLE PERSONAL AUDIOVISUAL DEVICE FOR USE IN NETWORKED APPLICATION-SHARING SYSTEM, filed Aug. 24, 2007, and to U.S. Utility patent application Ser. No. 12/144,561, entitled SYSTEMS AND METHODS FOR INTERACTION WITH VIRTUAL WORLDS USING AN ELECTRONIC DEVICE, filed on Jun. 23, 2008. The content of each of these applications is hereby incorporated by reference herein in its entirety for all purposes. These applications may also be denoted collectively herein as the "related applications."

BACKGROUND

It is well known that broadband Internet connectivity is becoming substantially more pervasive among consumers as a result of competition among service providers utilizing various different technologies (e.g., cable, digital subscriber line (DSL), satellite). In many households personal computers (PCs) constitute the primary users of the bandwidth furnished by these broadband connections. In order to facilitate sharing of the Internet connection among PCs in a given household, a variety of "wired" and "wireless" home networking technologies have been utilized.

As a result of the impracticality of installing Ethernet cable throughout a residence, RF-based wireless networking technology is becoming increasingly commonplace among consumers. Although systems based upon the 802.11b, or "Wi-Fi", wireless networking standard may currently be the most pervasive, versions of the 802.11 standard offering increased bandwidth have been introduced and yet higher-bandwidth approaches have been proposed.

The increased bandwidth available within the home has increased the usage of a number of different services, such as Internet-based delivery of digital audio, video and graphic content. However, since many of these services are facilitated by a desktop or notebook PC capable of communication over a broadband Internet connection, users are forced to remain proximate to their respective computers in order to utilize such services. Although other strategies to leverage the availability of broadband Internet connectivity within the home are currently being developed, many of these approaches involve creation of a relatively powerful, costly centralized communications "hub" (e.g., a PC with enhanced media capabilities, or a multi-purpose cable set-top box). Unfortunately, this typically requires either the purchase of an expensive hardware device or extended subscription plan, and constrains the extent to which Internet-enabled entertainment or other services are enjoyed outside of the immediate vicinity of the centralized hub device. In addition, user's are typically constrained to traditional input devices such as keyboards and computer mice.

Consequently, as broadband networking rapidly expands and the types of non-traditional networked devices expand, the need for alternate methods for providing input to these non-traditional devices is also expected to increase. Accordingly, there is a need in the art for improved systems and methods for providing user input to these new devices, as well as to traditional devices.

SUMMARY

The present invention relates generally to systems and methods for providing gesture recognition for input device applications.

In one aspect, the present invention relates to a system for providing gesture information associated with a target, comprising a first light emitting element, an imaging module disposed to detect light emitted from the first light emitting element and reflected from the target and generate one or more frames of image data based at least in part on the detected light and a processing module including a memory and a processor, said processing module coupled to the imaging module to receive the one or more frames of image data, generate output data based at least in part on said one or more frames of image data, said output data including data associated with a position or motion of the target and store the output data in a memory.

In another aspect, the present invention relates to a system for providing gesture information associated with a target, comprising a first light emitting element, an imaging module disposed to detect light emitted from the first light emitting element and reflected from the target and generate one or more frames of image data based at least in part on the detected light, a processing module including a memory and processor, said processing module coupled to the imaging module to: receive the one or more frames of image data, generate output data based at least in part on said one or more frames of image data, said output data including data associated with a position or motion of the target and store the output data in a memory and wherein the processing module is further configured to generate a control signal based at least in part on the one or more frames of image data and the system further comprises a modulation control module coupled to the processing module and the first light emitting element, wherein said control module is configured to receive the control signal and generate an emitter control signal to control operation of the first light emitting element so as to selectively illuminate the target.

In another aspect, the present invention relates to a method of providing gesture information associated with a target, comprising providing a first light output from a first light source to illuminate the target, receiving light reflected from the target from the first light output, generating a first image based on the received light, generating output data associated with a position of the target based at least in part on the first image and storing the output data in a memory.

In another aspect, the present invention relates to a machine readable medium comprising processor executable instructions that when executed on a processor selectively control generation of a first light output to illuminate a target, generate one or more images based on light reflected from the target and generate a set of output data associated with a position of the target based at least in part on the one or more images.

Additional aspects of the present invention are further described and illustrated herein with respect to the detailed description and accompanying drawings.

BRIEF DESCRIPTION OF THE DRAWINGS

For a better understanding of the nature of the features of the invention, reference should be made to the following detailed description taken in conjunction with the accompanying drawings, in which:

FIG. 7 illustrates an embodiment of a pixel grid with pixel specific filtering in accordance with aspects of the present invention.

DETAILED DESCRIPTION OF EMBODIMENTS OF THE INVENTION

Figure 1:
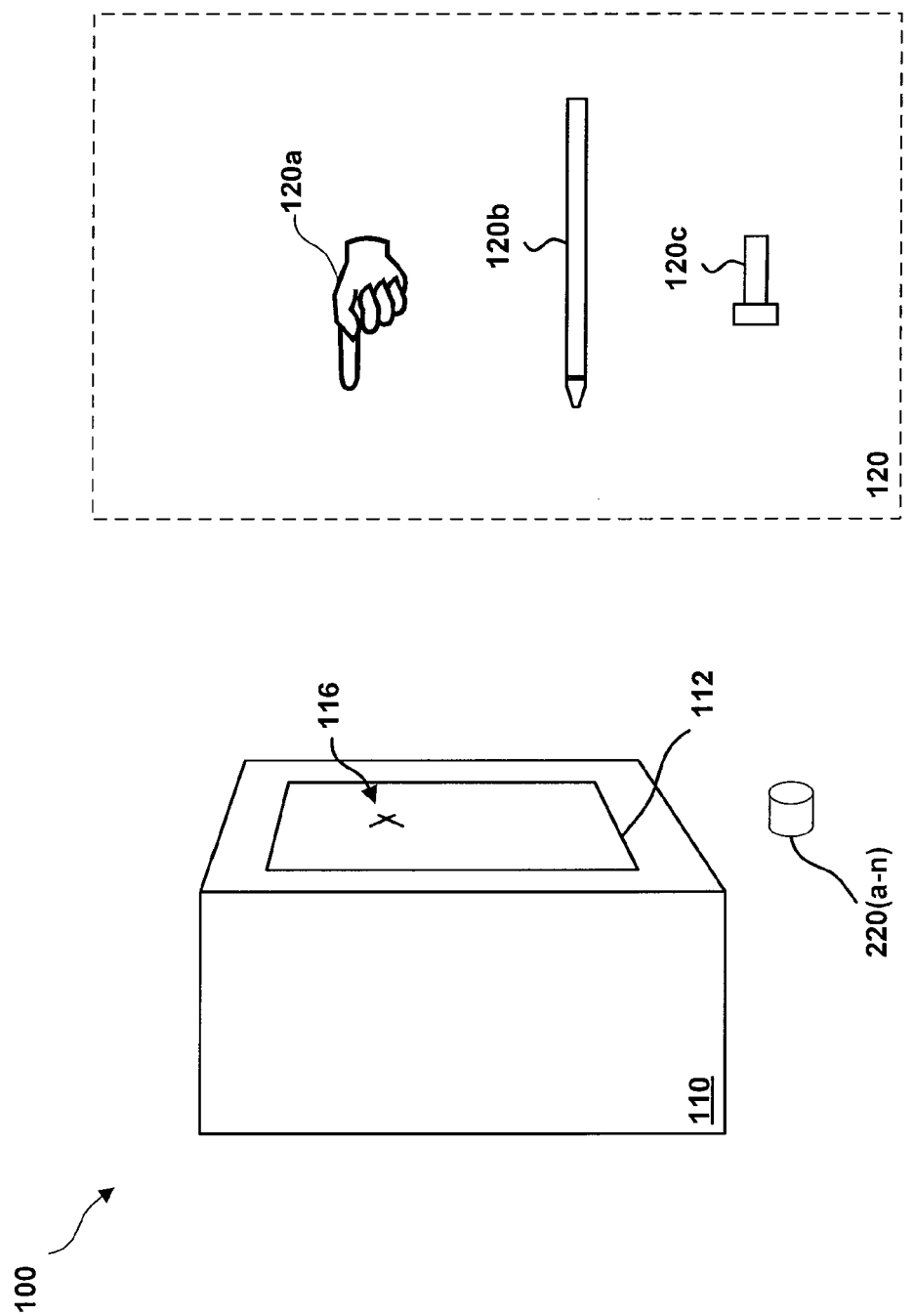
FIG. 1 illustrates a high level view of a system for providing user input to a device in accordance with aspects of the present invention.

This application is related to U.S. Utility patent application Ser. No. 12/172,893, entitled SYSTEMS AND METHODS FOR ALARM TONE SELECTION, DISTRIBUTION, AND PLAYBACK IN A NETWORKED AUDIOVISUAL DEVICE, filed on Jul. 14, 2008, to U.S. Utility patent application Ser. No. 12/144,561, entitled SYSTEMS AND METHODS FOR INTERACTION WITH VIRTUAL WORLDS USING A PORTABLE DEVICE, filed on Jun. 23, 2008, to U.S. Utility patent application Ser. No. 12/142,630, entitled SYSTEMS AND METHODS FOR DEVICE REGISTRATION, filed on Jun. 19, 2008, to U.S. Utility patent application Ser. No. 12/131,809, entitled SECURITY AND AUTHENTICATION SYSTEMS AND METHODS FOR PERSONALIZED PORTABLE DEVICES AND ASSOCIATED SYSTEMS, filed on Jun. 2, 2008, to U.S. Utility patent application Ser. No. 11/953,756, entitled SYSTEMS AND METHODS FOR LOCATION, MOTION, AND CONTACT DETECTION AND TRACKING IN A NETWORKED AUDIOVISUAL DEVICE, filed Dec. 10, 2007, to U.S. Utility patent application Ser. No. 11/845,027, entitled SYSTEM AND METHOD FOR AUTOMATICALLY UPDATING THE SOFTWARE OF A NETWORKED PERSONAL AUDIOVISUAL DEVICE, filed Aug. 24, 2007, to U.S. Utility patent application Ser. No. 11/845,026, entitled SYSTEM AND METHOD FOR TRANSFERRING ELECTRONIC CONTENT TO NETWORKED PERSONAL AUDIOVISUAL DEVICES, filed Aug. 24, 2007, to U.S. Utility patent application Ser. No. 11/845,021, entitled NETWORKED PERSONAL AUDIOVISUAL DEVICE HAVING FLEXIBLE HOUSING, filed Aug. 24, 2007, to U.S. Utility patent application Ser. No. 11/845,018, entitled CONFIGURABLE PERSONAL AUDIOVISUAL DEVICE FOR USE IN NETWORKED APPLICATION-SHARING SYSTEM, filed Aug. 24, 2007, U.S. Utility patent application Ser. No. 12/144,561, entitled SYSTEMS AND METHODS FOR INTERACTION WITH VIRTUAL WORLDS USING AN ELECTRONIC DEVICE, filed on Jun. 23, 2008. The content of each of these applications is hereby incorporated by reference herein in its entirety for all purposes. These applications may also be denoted collectively herein as the "related applications."

The present invention generally relates to systems and methods for gesture recognition for input device applications. As used herein gesture recognition relates generally to tracking of the motion or other gesture characteristics of a pointer or body part of a human, such as a hand or finger; however, the systems and methods described herein may also relate to similar applications or to objects having similar characteristics. Accordingly, the embodiments described herein are provided for purposes of illustration, not limitation. Various embodiments of the invention are described in detail below with reference to the figures, wherein like modules or elements are referenced with like numerals throughout unless noted otherwise.

Overview

The present invention relates generally to systems and methods for providing gesture recognition for input device applications.

In one embodiment, the present invention is directed to a system for providing gesture information associated with a target, comprising a first light emitting element, an imaging module disposed to detect light emitted from the first light emitting element and reflected from the target and generate one or more frames of image data based at least in part on the detected light and a processing module including a memory and a processor, said processing module coupled to the imaging module to receive the one or more frames of image data, generate output data based at least in part on said one or more frames of image data, said output data including data associated with a position or motion of the target and store the output data in a memory.

In another embodiment, the present invention relates to a system for providing gesture information associated with a target, comprising a first light emitting element, an imaging module disposed to detect light emitted from the first light emitting element and reflected from the target and generate one or more frames of image data based at least in part on the detected light, a processing module including a memory and processor, said processing module coupled to the imaging module to: receive the one or more frames of image data, generate output data based at least in part on said one or more frames of image data, said output data including data associated with a position or motion of the target and store the output data in a memory and wherein the processing module is further configured to generate a control signal based at least in part on the one or more frames of image data and the system further comprises a modulation control module coupled to the processing module and the first light emitting element, wherein said control module is configured to receive the control signal and generate an emitter control signal to control operation of the first light emitting element so as to selectively illuminate the target.

In another embodiment, the present invention is directed to a method of providing gesture information associated with a target, comprising providing a first light output from a first light source to illuminate the target, receiving light reflected from the target from the first light output, generating a first image based on the received light, generating output data associated with a position of the target based at least in part on the first image and storing the output data in a memory.

In another embodiment, the present invention is directed to a machine readable medium comprising processor executable instructions that when executed on a processor selectively control generation of a first light output to illuminate a target, generate one or more images based on light reflected from the target and generate a set of output data associated with a position of the target based at least in part on the one or more images.

Additional details of various embodiments are further described below.

Methods and associated systems for providing an input device and input signal processing for a system including a flat panel display (such as an LCD, OLED, plasma, or other flat panel technology) or other display type (such as a CRT) are described herein. In typical embodiments, the method uses one or more active light emitter elements (such as an LED) to generate reflections at a particular wavelength, such as at infra-red (IR) wavelengths, from pointing objects or targets. As used herein, the term infra-red generally refers to wavelengths of electromagnetic radiation whose wavelength is longer than that of visible light (400-700 nm), but shorter than that of terahertz radiation (100 μm-1 mm) and microwaves (~30,000 μm). Infrared radiation spans roughly three orders of magnitude (750 nm and 100 μm). Although the described embodiments typically describe use of infra-red radiation, in some embodiments radiation at other wavelengths or band may alternately be used.

The reflections from the target are then captured with an imaging module, which may include an element such as a CMOS or CCD element in a device such as a digital camera, and processed in a processing element using one or more CPUs, DSPs or other image processing apparatus to generate a signal and/or data corresponding with a user or target's position, shape and/or motion.

The described embodiments may provide a number of advantages, including allowing use of conventional, inexpensive CMOS or CCD cameras (or other camera imaging elements as are known or developed in the art) capable of imaging in the selected wavelengths (such as IR) for detection elements, using conventional, inexpensive IR LED emitters (or other types of emitters in some embodiments) to generate light, thereby providing a pointing device capable of single and/or multiple point gesture recognition to implement a "minority report" style interface. This can be used to determine gesture characteristics such as location, motion, shape, size gesture patterns (pattern of motion such as circular, oval, square, up-down, in-out, left-right, etc.).

In addition, embodiments of the invention may provide a modal interface where a single camera may be used for conventional imaging as well as for gesture recognition input, may allow for very low system cost (i.e., lower cost than conventional touchscreens, especially at larger diagonals), as additional components may be as minimal as a camera (which may already be included in a flat-panel display design), LEDs (or other low cost emitter elements), PC or other processor and associated memory and other hardware and software, as well as a modulation controller. Processing functionality may be provided by a processor already included in the system. In various embodiments, signal processing may be done quickly and inexpensively at the expense of absolute accuracy. Some embodiments facilitate providing a pointing mechanism that, unlike touch screens, accomplishes gesture recognition for rich interactivity with little additional system cost beyond that of already included components. In some embodiments, a feature of the invention is the use of a modulated active LED array. Various modulation methods may be used to help reduce the computational load for signal processing as well as to increase the robustness of the gesture recognition.

Details of Embodiments of System Implementations

Attention is now directed to FIG. 1 which illustrates a high level view of an embodiment of a system 110 for gesture recognition for input applications in accordance with the present invention. As described herein, gesture recognition describes detection of a target's location, motion, shape, size or other physical characteristics of the target, such as changes in these parameters. Gesture patterns are characterized by detecting specific gestures such as up-down motion, left-right motion, in-out motion, shapes (square, circle, etc.) or other patterns made by a user. As illustrated in FIG. 1, system 110 for gesture recognition may be positioned in proximity to a user (not shown). A body part of the user (such as a hand or finger 120a used as a pointer) or a pointing device 120b or other pointing, gesture or motion generating device, may allow the user to merely point or otherwise gesture at a display element 112 of system 110, such as by using the user's hand 120a or a pointing device 120b or IR reflector 120c, and have the system 110 identify position and/or motion associated with the user's pointing device or target 120. The user's gesture or position indication may also be shown on a display screen 112 of system 110 and may be used to select or position a cursor 116 or other visual indication of the user's input. Other user motions may be detected to providing selection or "clicking" functionality, such as is presently provided by a computer mouse click or other selection mechanism.

Figure 2:
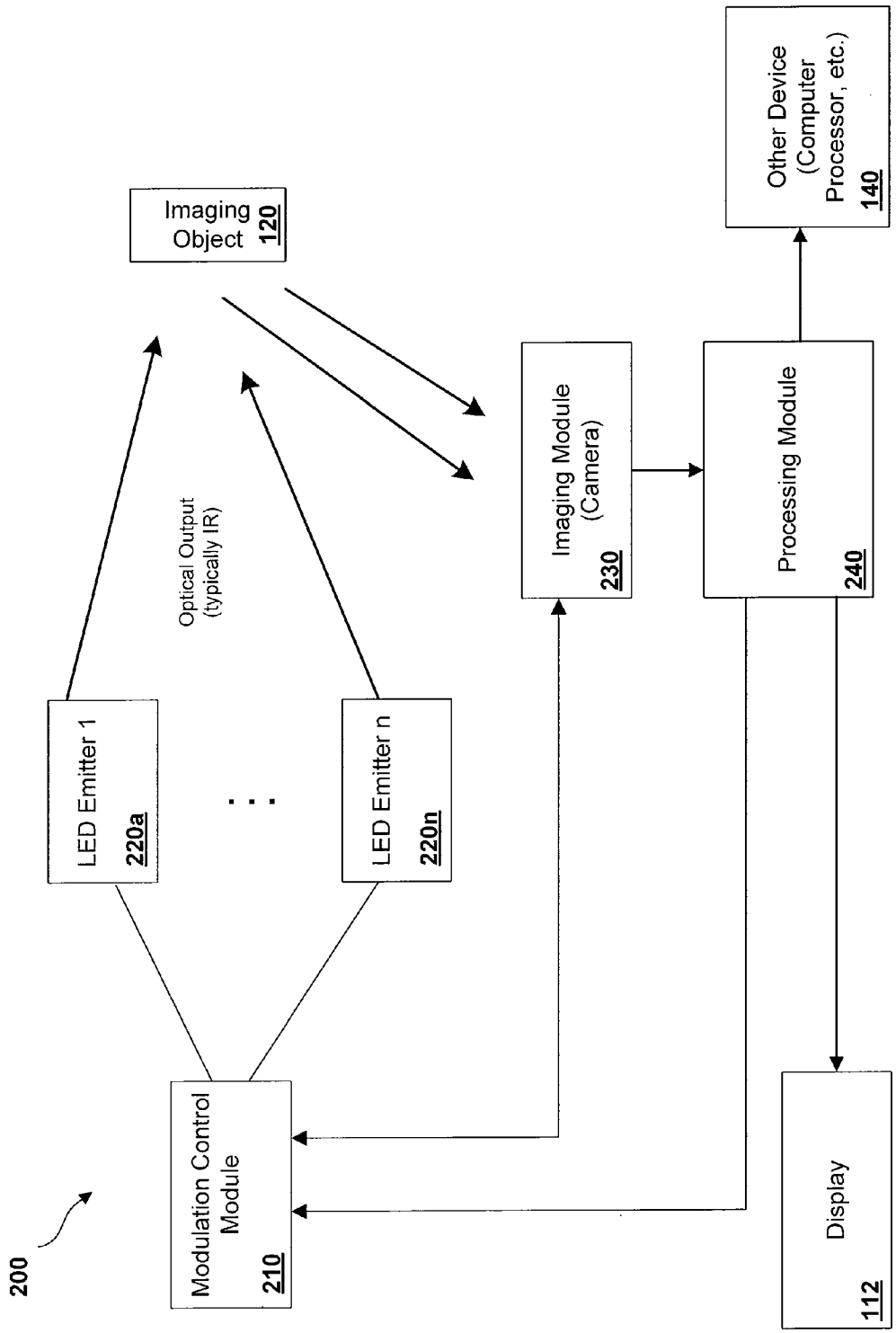
FIG. 2 illustrates a block diagram of an embodiment of a system for providing user input in accordance with aspects of the present invention.

Attention is now directed to FIG. 2 which illustrates an embodiment of additional details of a system 110 in accordance with aspects of the present invention. System 110 may include one or more light emitting diode (LED) elements 220a-220n, a modulation control module 210 configured to control the LED element(s) 220a-220n, an imaging module (also denoted herein as an imager or camera) 230 and a processing module 240. In a preferred embodiment, the LED elements will include infra-red (IR) LED devices to generate IR light; however, in some embodiments other light emitting devices configured to operate at IR, visible light, UV or other wavelengths may alternately be used. The imager module 230 may be based on a CMOS or CCD camera, or other imaging element technology as is known or developed in the art. In an exemplary embodiment, imager module 230 is a low resolution (VGA or similar resolution) CMOS camera.

In some embodiments, imaging module 230 may be an off the shelf camera, and the camera may include an internal IR filter which may or may not be removed, depending on the parameters of the application. For example, if the IR filter is in place, received IR light might may be attenuated, thereby requiring higher IR emitter power to generate sufficient light. Alternately, if the IR filter is removed, some image quality may be sacrificed during non-recognition mode. In some embodiments, an alternate construction may be used in the camera, where alternating pixels, or sub-portions of the pixel array, are coated with an IR filter or otherwise configured to selectively block IR so that simultaneous IR and filtered IR images may be obtained. In addition, in some embodiments it may be desirable to use more than one camera in order to improve image processing and/or implement features such as stereoscopic imaging. For the sake of simplicity in the explanation that follows, the camera is assumed to have a conventional, single mode operation; however, alternate configurations such as those described above, as well as others, are also contemplated.

The modulation control module 210 may include hardware, software and/or hardware/software combinations configured to provide functionality related to controlling amplitude modulation, time code modulation, spacial modulation and/or other LED output control functionality. Amplitude modulation may be implemented to compensate for the relative distance between the imaging object 280 (also described herein as a pointing device or target) and the LED emitter(s) 220. Time code modulation may be implemented to create a unique signature from frame to frame to assist in extracting foreground features from background features. Spacial modulation may also be used to assist in extracting foreground features from background features. In a typical embodiment, where a single camera 230 is used, the LEDs may be controlled by modulating their output in accordance with a particular sequence. For example, in a two LED system, a typical modulation scheme using a left (L) LED and a right (R) LED may involve driving L, R, turning output off (OFF), L, R, OFF and so forth. Each illumination period will typically be set to the same length based on the scanning characteristics of the camera 230. For example, the timing may be set so that each LED is illuminating for one vertical scan period of the camera 230, and therefore the camera will sample alternate frames of L, R and no illumination.

The modulation control module 210 may be coupled to the processing module 240 so as to receive a control signal, or other signals from the processing module to facilitate emitter 220 output control to illuminate the pointing device/target. The control signal is typically based at least in part on characteristics of the target of interest, such as position, size, shape and/or motion as well as a desired illumination output level. In addition, the imaging module 230 may be coupled to the processing module 240 and/or to the modulation control module 210 so as to provide image information, typically in the form of image pixels or frames, so as to facilitate target location and motion detection as is described herein.

Processing module 240 is configured to implement the signal/image processing described in further detail herein based on images received from the imaging module 230, and store output data associated with target characteristics such as position or location, size, shape, movement, gestures or other information in a memory of the processing module 240 or in another memory. As used herein, the term memory may refer to one or more physical memory device capable of storage of digital data. These memory devices may be a single device or array of device, or may be two or more separate device or arrays of devices. In addition to storing data associated with images and target information, processing module 240 may also provide the output data or an output signal to a display device, such as display 112, to display the position, or other information about the target (such as movement, change is size or shape, etc.) and/or to integrate this information with other display data (such as to show the user/targets input in conjunction with other displayed information). Output associated with target characteristics such as position, size, shape, movement, gestures, or other information may also be provided from the processing module 240 as a signal or output data to a separate device 140 as shown in FIG. 2, which may be another computer device, storage device, display device, or other type of device.

Figure 3:
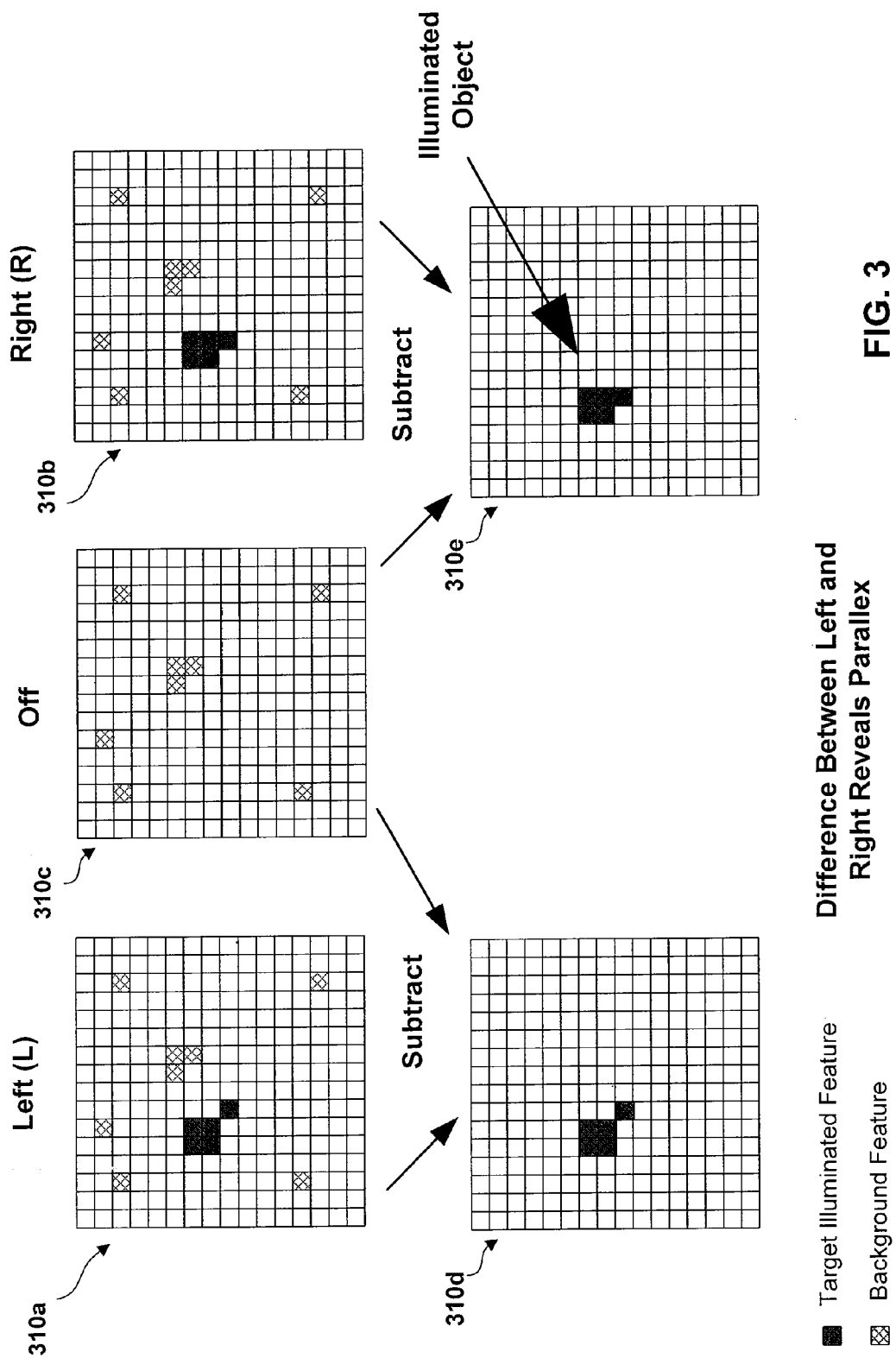
FIG. 3 illustrates an embodiment of pixel grids used for signal processing in accordance with aspects of the present invention.

FIG. 3 illustrates aspects of a driving sequence from emitter elements 220 and associated processing, where pixel image grid 310a shows an image received from illumination from the Left (L), grid 310b shows an image received from illumination from the Right (R), and grid 310c shows an image received without IR illumination, serving as a background reference image. In processing the received images, the background reference image can be subtracted from the left and right images respectively to generate enhanced left grid 310d and enhanced right grid 310e to highlight only objects that generate reflections primarily from the provided IR illumination. This approach can be used with a single illumination output (i.e., the L or R illumination alone, which can be used in a simplified configuration to merely detect directional movement of a target object without determining parallax, such as may be used to determine distance as well as motion). The single LED approach may be useful in application where determination of gestural configurations, such as specific movement patterns (for example circular, left to right, up-down, slow-fast speed, etc.) are desired. If two or more LEDs are used, additional information (such as distance using parallax) can also be determined. In these application where grids will contain images of objects reflected from different perspectives or sides, time interpolation of stereo images may be performed to provide enhanced depth detection.

Figure 4:
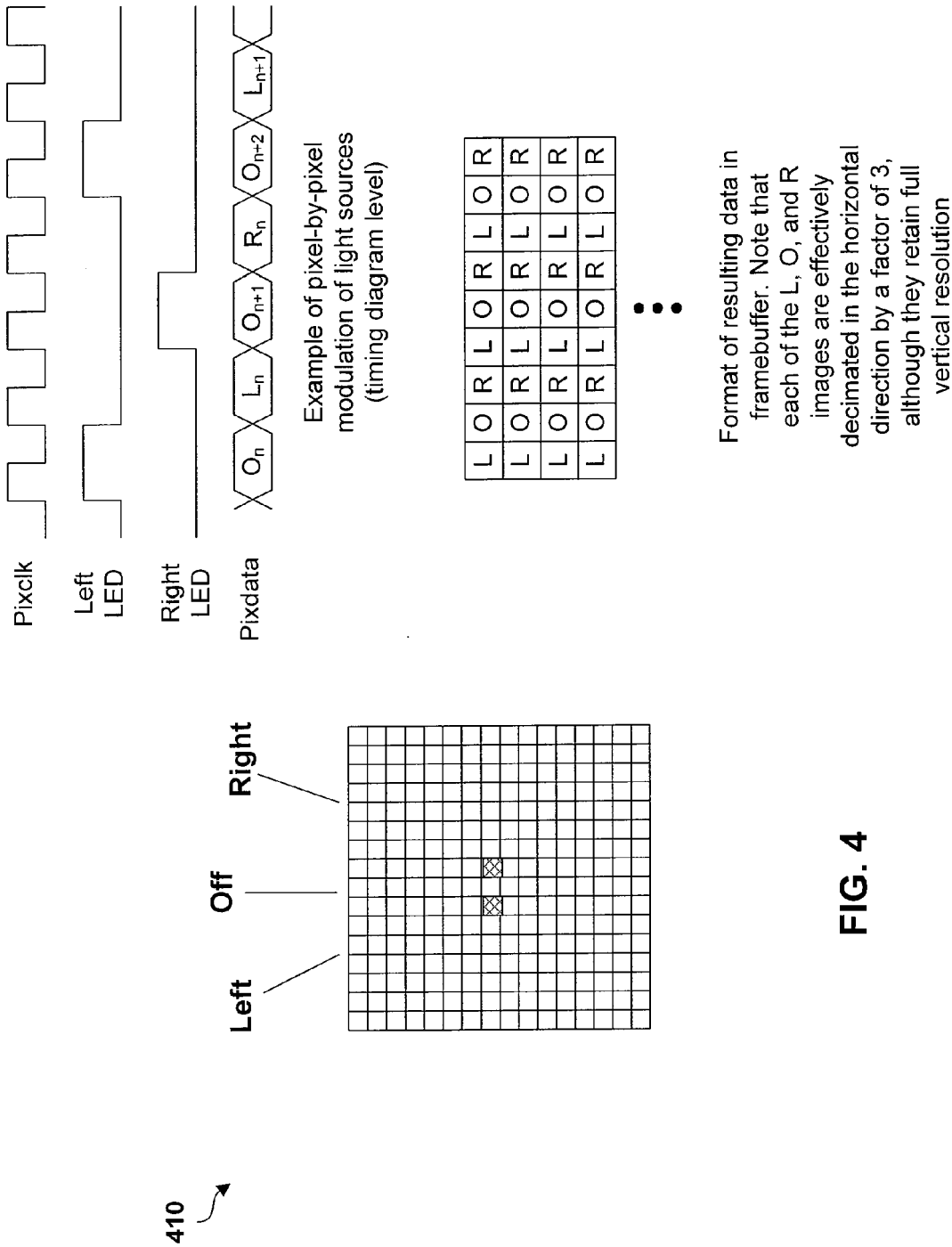
FIG. 4 illustrates an embodiment of a pixel grid and associated signaling in accordance with aspects of the present invention.

In other embodiments different modulation schemes may be used. For example, in one embodiment as shown in FIG. 4, the L, Off and R signals may be generated on a per-pixel basis, so that for each pixel clock on the camera, the modulation scheme is changed. In this specific example, the resulting image in the frame buffer is essentially three pictures of the same scene, lit from different angles, and spatially interleaved with each other. Each of the three pictures of the scene are either lit with the Left LED, lit with ambient light only, or lit with the Right LED. Because the pictures are spatially interleaved, each picture may be horizontally decimated by a factor of three to allow them to fit within a single frame. This may be useful if the camera provides higher resolution and the CPU has sufficient power to process the resulting data. In this case, the adjacent pixels may be subtracted from each other to create L and R images from a single frame of data. The data will typically be coarsely downsampled in the process.

Figure 5:
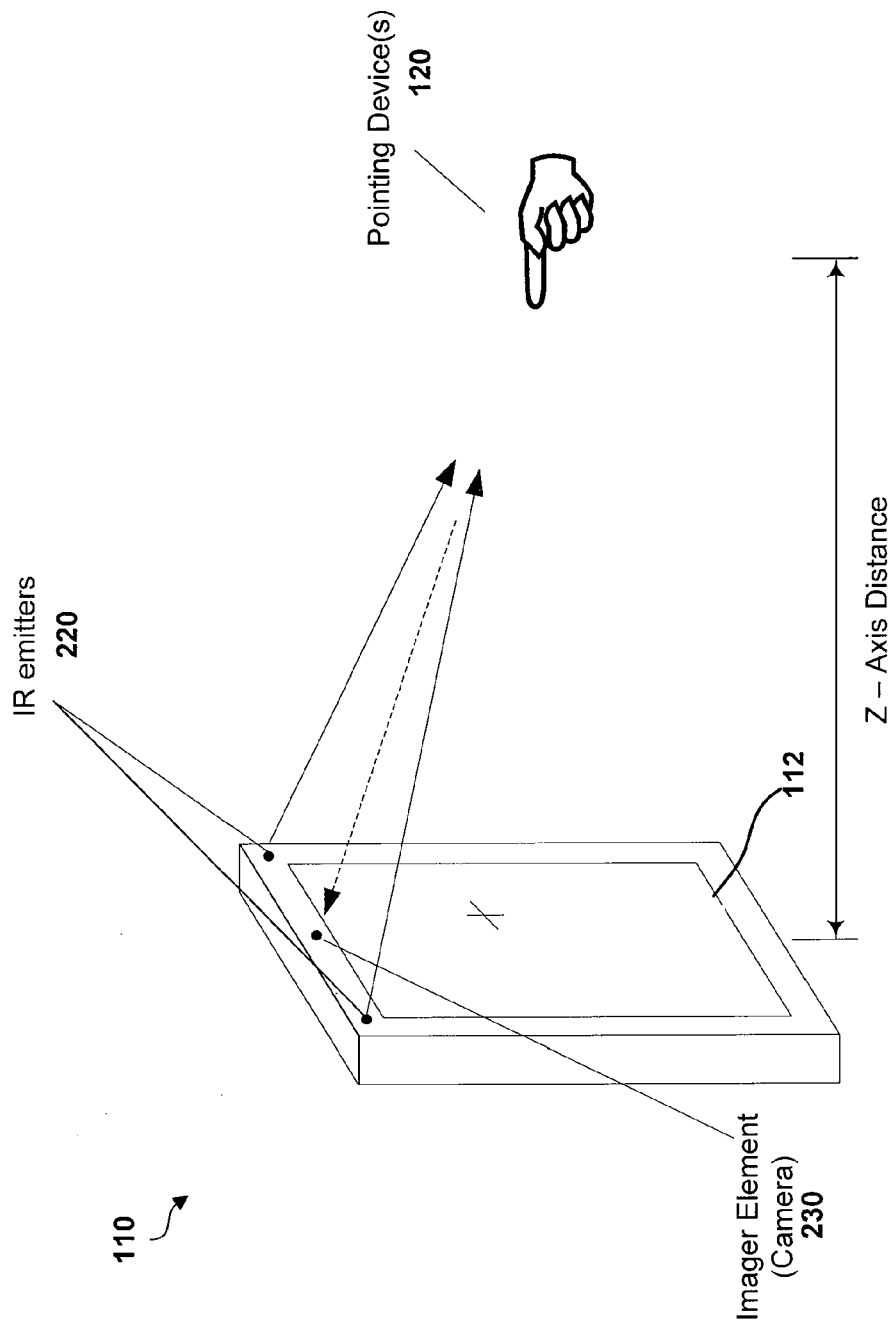
FIG. 5 illustrates an embodiment of additional details of a system for providing user input in accordance with aspects of the present invention.

FIG. 5 illustrates additional details of an embodiment of system 110 in accordance with aspects of the present invention. The IR emitters 220 may be positioned at the top of a display or case of system 110 on opposite sides to provide maximum differential illumination to pointing device 120. Alternately, emitters 220 may be placed at the bottom, sides or externally to system 110 in some embodiments. In some embodiments, only a single IR emitter 220 may be used, and alternately, in some embodiments, more that 2 IR emitters may be used. If a single emitter 220 is used, it would preferably be positioned at either the horizontal or vertical center, or potentially at both, however, other locations may also be used.

A camera module 230 may likewise be positioned at the top of the display or case of system 110 centered between the IR emitters 220 (as shown), or at other locations in some embodiments. As shown in FIG. 5 the pointing device 120 is a human finger, which reflects IR illumination in a diffuse fashion. Other devices providing IR reflectivity (or alternately reflectivity at another wavelength if different wavelength emitters are used) may also be used. As described previously, the IR emitters may be modulated dynamically to adjust the output brightness so that a single dominant spot is detected, which may be presumed to be the pointing object closest to the camera module 230.

In some embodiments, a specifically selected IR reflective target 120c (as shown in FIG. 1) may be used as the pointing device 120. For example, an IR reflective FOB or deformable pointer, such as a small handheld piece of plastic with a mirrored end on one side may be used. The pointer may be made deformable so that the reflective shape changes when the pointer is squeezed by a user. During normal operation, the pointer will typically be the brightest object in the image field due to a selected high reflectivity at the wavelength(s) of interest of the pointer material, and/or due to the proximity to the IR emitters 220. If a user then wishes to select a particular item, he may squeeze or otherwise manipulate the pointer so that the detected shape is changed and the associated image processing in processing module 240 may then be configured to interpret this as a "click" or other selection action.

For example, if a single LED is used and the target is a squeezable device, the general shape (as well as, in some cases, position) of the squeezable device will change, with the detected change then translated into a corresponding action. This detection may be further enhanced by using multiple LEDs positioned differently relative to the target.

Even in cases where an object such as a finger is used, it is still possible to implement a similar type of detection using parallax to detect the Z-axis distance from the display to the pointing object. For example, clicking detection may be based on the user moving or thrusting his finger towards or away from the display, with corresponding changes in the size, shape or configuration detected in processing module 240. Alternately, with a single LED emitter, turning or otherwise repositioning the finger (or other target object) to change shape, size and/or position may also be detected and processed to determine a corresponding action.

Figure 6:
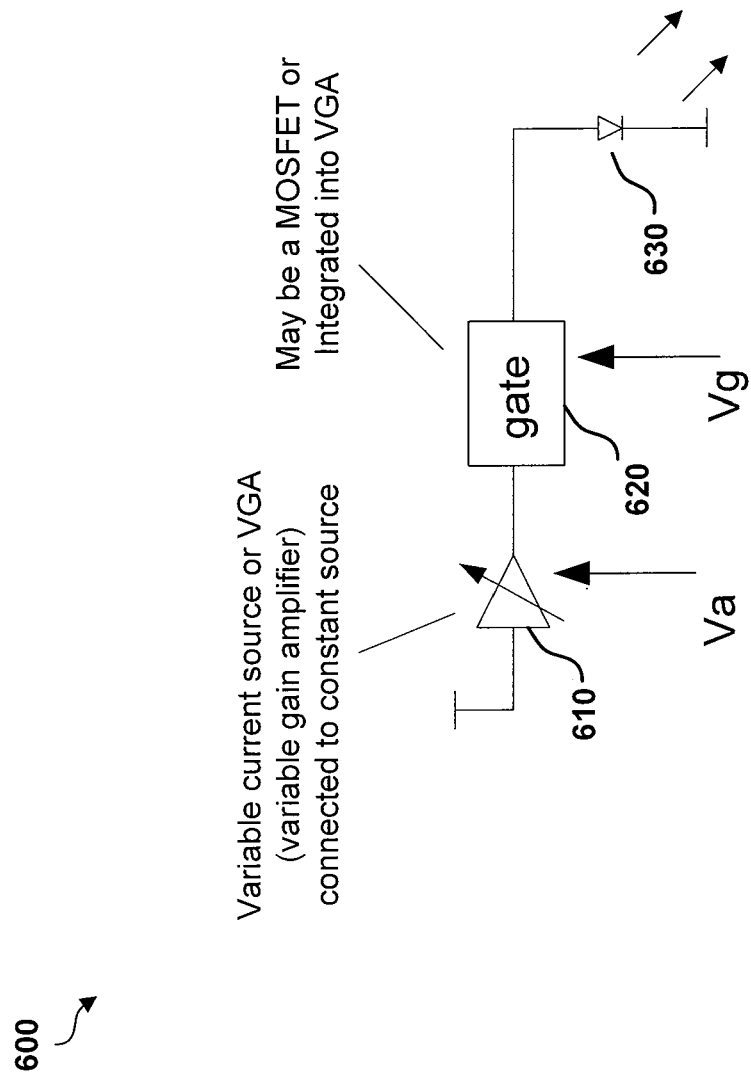
FIG. 6 illustrated an embodiment of an IR transmitter section for use in embodiments of the present invention.

Another aspect of the present invention relates to use of coded illuminators to simplify signal processing. FIG. 6 illustrates an embodiment of a circuit 600 for implementing an IR transmission sub-section for system 110 for use in conjunction with modulation control module 210. The circuit includes an amplitude modulation (AM) element 610, which may be a variable current source or variable gain amplifier connected to a constant source, a gating element 620, which may be a MOSFET switch or other gating logic either standing alone or built into element 610 if the AM has a mode for turning the signal on and off, and an LED element 630, which will typically include an IR emitter device. Control signals Va and Vg may be coupled to circuit 600 as further described below.

Signal Vg may be generated based upon the pixel clock or vertical sync period of imager element 230 (or other parameters) to provide various operating modes. In one embodiment, based on pixel clock generation, Vg is toggled once every N clock cycles, where the pattern is aligned to the horizontal sync period such that there are H pixels modulo N clock cycles of "unused" pixels to the right hand side of the image, assuming a raster scan from left to right. In this case, a single image frame consists of a striped composite of the target image with alternating LEDs illuminating the image. A potential advantage of this implementation is that the sampling rate of the processing algorithm may run as fast as the maximum frame rate of the camera, enabling a very responsive interface capable of resolving fast motion. Disadvantages may include parallax error and higher data rates for signal processing. For many applications the parallax error will not be significant, however, in an embedded application CPU loading should be considered.

In another embodiment based on vertical sync generation, Vg may be toggled once every N vertical sync periods. In this implementation, a time series of whole images is generated, with each image illuminated by a different LED from a different angle. A potential advantage may be that the signal processing requirements are lower, especially if the image is adaptively downsampled. For static or slow-moving pointing objects, the spatial resolution and accuracy can be higher. Disadvantages, especially as N grows large, may include decrease in the rate of motion tracking and possible increase in temporal error.

Amplitude control signal Va is typically generated based on a feedback loop implemented in a signal processing module. Typically, Va will be adjusted so that only the nearest objects are illuminated at a targeted light level. This may aid in reducing or eliminating background clutter. In accordance with one embodiment, an exemplary feedback algorithm begins in a lock phase, which converges from darkness. Initially, the LED illuminator(s) 220 are turned off, and only ambient noise is present and detectable at the camera module 230. With each progressive time step, the LED output is ramped up, until bright spots are visible in the difference between the on and off states of the LED emitter 220. At this point, the loop transitions to a tracking mode. In this mode, as the pointer 120 is observed to become brighter or dimmer, the LED signal is modulated accordingly to attempt to track the pointer to keep it at a constant level of brightness.

If there is a lot of active background noise, or a high DC offset, it may be difficult to track and converge the signal. In this case, Va and Vg may be generated in a combined fashion to create a coded signal. This approach may increase the signal processing load but also increases the discrimination ability of the system. In this embodiment, Va still modulates around a large bias point, but additionally a small signal may be injected on top of Va. This signal may be configured to vary from pixel to pixel as well as from frame to frame. The signal may have a time-varying orthogonal code imprinted upon it such that spatial and temporal autocorrelation against the resulting raster signal will reject active background transmitters and amplify the desired modulated signal. The resulting 3-D result may be further processed to extract the exact time and space coordinates of the pointing object.

Many commercially available CMOS digital cameras can provide their output in a format where the luminance channel is separate from the chrominance channels, such as YCrCb. Generally, the CMOS camera should be configured to output data in this mode (as opposed to red, green, blue (RGB) output) so as to reduce the image processing load, since with an IR sensor the output is inherently monochrome and the luminance channel can be used. However, in some embodiments a variant of the processing algorithm could be used with red, green, and blue LED emitters, each at a different angle, illuminating the target object. In this implementation, there would be less need for Vg control, and instead the optical RGB filters inside the camera would facilitate extracting the various component LED signals.

While this approach may have certain advantages, it has a potential disadvantage of introducing a large amount of visible light into the system. In typically implementations, one of the advantages of using IR is that IR LED devices can be very powerful, as well as inexpensive, and their output can saturate the target image with IR light, drowning out any ambient IR lighting. Fortunately, most CMOS cameras have some sensitivity to IR (hence the need for an IR filter in cameras to avoid seeing through clothing in some cases). As mentioned previously, in one embodiment the IR filter is eliminated from the camera assembly to reduce the emission requirements of the IR array. Alternatively, a patterned IR filter may be placed across the image sensor array so that the visible light sensitive portions maintain their IR rejection.

Attention is now directed to FIG. 7 which illustrates an IR filter pattern 710 in accordance with an embodiment of the invention. Most cameras have colored gels over each pixel to define R, G, and B. However, an alternate embodiment includes the R, G, and B gels having an included IR rejection element, as well as a fourth set of pixels 712, illustrated in hatched form in FIG. 7, that comprise a material that is transparent to IR so as to provide an IR channel or array. In this embodiment a custom camera chip is manufactured with this additional IR configuration added to the standard RGB pixel elements.

Details of Embodiments of Signal Processing Implementations

In general, signal processing of the image or images (and associated pixels) is done in the processing module 240 as shown in FIG. 2. Processing module 240 may then provide an output signal to modulation control module 210, which implements control of the LED emitter(s) 220$a$. In some embodiments, processing module 230 and modulation control module 210 may be combined in a single processing/control module, whereas, in other implementations they may be discrete modules.

In accordance with one embodiment, whether a series of images is obtained at imaging module 230 using the previously described pixel clock or vertical sync methods, the first processing step in processing module 240 is to separate the image into various illumination planes, $P0,i$, $P1,i$, $P2,i$, . . . $Pn,i$ where $P0,i$ is the reference "dark" plane for the ith iteration, and $P1,i$ and upwards reflect to image planes taken with each LED at a different angle for the ith iteration. For the vertical sync method, dividing the image into planes is trivial. For the Pixel clock method, each vertical stripe is extracted from the 2-D image and copied to respective plane buffers.

Once the planes have been extracted, the next step is to determine the difference versus the reference plane, Po,i. The difference images contain the desired signal plus background noise. For additional noise rejection, images may be temporally differenced against previous scenes. Therefore, $P1,i-P0,i$ yields the immediate difference between illuminated and dark scenes, and $P1,i-P1,i-1$ provides the difference between successive illuminated scenes. These two differences can be combined to enhance the contrast of the desired pointer object; various filters and autocorrelations can also be applied that are known or developed in the art of image processing to help enhance recognition. Examples for one embodiment are shown in FIG. 3.

In addition to providing noise rejection, successive $P1,i-P1,i-1$ allows for motion estimation to be implemented, so that a motion vector for the pointing object can be determined. This can be important for providing better tracking (using the assumption that all motions are smooth and disjoint movements are disallowed—there can be "dark" moments due to noise and interference and the algorithm can simply look where the next anticipated point should be to aid with re-acquisition of the pointer), and for optimizing foveation. In this approach, differences in motion, as well as size and/or shape, may be determined by comparing successive processed images to detect differences in the target.

$P1,i-P0,i$ and $P2,i-P0,i$ (and so forth) may also be used to extract parallax information about the object. In embodiments with two or more emitter elements 220, each of P1 and P2 may be generated from emitters (LEDs) positioned at different locations around the imaging area. The phase shift introduced by the difference in illumination can be used to infer the distance of the object from the screen. This is illustrated in FIG. 5, where the Z-axis distance is determined based on the difference in images from the right and left illumination.

In accordance with one embodiment, a goal of the signal processing algorithm implementation is to reduce the processing load so that a very computationally light implementation can leverage existing or available system resources, particular where system resources are limited. There are several optimization approaches that may be applied to achieve this goal. In one approach, during periods of no detected motion, the sampling rate can be reduced, and images should be heavily downsampled prior to computation. This puts the device in "search" mode where it is only occasionally polling the environment for the presence of a pointer object, thereby liberating the host processor to perform other tasks.

Once a pointer object has been acquired, its general spatial location within the frame is known. Thus, the algorithm can be adaptively tuned to foveate about the pointer object (in humans, a fovea is the part of the eye with a great density of receptors, responsible for focused detail; the process of focusing on detail is called foveation). In the simplest implementations there are two parameters: the maximum speed of the pointer object and the size of the object. The fovea of the algorithm should be at least large enough to track the anticipated size of the object, plus some margin of error. Additionally, the fovea should be made large enough to capture the anticipated maximum frame-to-frame motion of the pointer object. Inside the fovea, the algorithm will perform detailed, pixel by pixel computations. Outside the fovea, the algorithm may either choose to ignore the image, or preferably, operate on a heavily downsampled version to provide graceful recover in case the fovea is lost. The relative position of the fovea of the algorithm is tantamount to the inferred "pointer" from the image scene. In the case of a multi-touch algorithm, multiple fovea would be required, each tracking their own point.

It is noted that the present invention may relate to processes such as are described or illustrated herein and/or in the related applications. These processes are typically implemented in one or more modules comprising systems as described herein and/or in the related applications, and such modules may include computer software stored on a computer readable medium including instructions configured to be executed by one or more processors. It is further noted that, while the processes described and illustrated herein and/or in the related applications may include particular stages, it is apparent that other processes including fewer, more, or different stages than those described and shown are also within the spirit and scope of the present invention. Accordingly, the processes shown herein and in the related applications are provided for purposes of illustration, not limitation.

Some embodiments of the present invention may include computer software and/or computer hardware/software combinations configured to implement one or more processes or functions associated with the present invention such as those described above and/or in the related applications. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

I claim:

1. A device for processing gesture information, comprising:
　a light emitting element to:
　　emit light outside a human-visible spectrum;
　an image sensor including a plurality of image pixel sensor elements disposed in a grid of pixels, the image sensor to generate signal data from the plurality of image pixel sensor elements, and the plurality of image pixel sensor elements including:
　　a first set of pixel elements to detect light inside the human-visible spectrum; and
　　a second set of pixel elements to detect light outside the human-visible spectrum emitted from the light emitting element and reflected from a target;
　　wherein the signal data generated from the image sensor includes data from the light detected inside the human-visible spectrum and data from the light detected outside the human-visible spectrum;
　a digital camera including the image sensor, the digital camera to:
　　capture a first set of two-dimensional image data from the signal data generated from the image sensor in a period of time, the first set of two-dimensional image data indicating the detected light outside the human-visible spectrum;
　　capture a second set of two-dimensional image data from the signal data generated from the image sensor in the period of time, the second set of two-dimensional image data indicating the detected light inside the human-visible spectrum;
　　produce a first plurality of image frames from the first set of two-dimensional image data based at least in part on the detected light outside the human-visible spectrum; and
　　produce a second plurality of image frames from the second set of two-dimensional image data based on the detected light inside the human-visible spectrum;
　a processor to execute instructions that:
　　process the first plurality of image frames; and
　　perform gesture recognition from at least the first plurality of image frames to identify a defined gesture pattern performed by the target.

2. The device of claim 1, wherein the processor is to further execute instructions that process the second plurality of image frames; and perform gesture recognition from at least the first plurality of image frames and the second plurality of image frames to identify the defined gesture pattern performed by the target.

3. The device of claim 1, further comprising a second light emitting element to emit light outside the human-visible spectrum.

4. The device of claim 3, wherein the light emitting element and the second light emitting element operate at separate times.

5. The device of claim 4, wherein the lighting emitting element and the second light emitting element operate at the separate times based on a modulation technique, the modulation technique using at least one of: amplitude modulation, time code modulation, or spatial modulation.

6. The device of claim 1, wherein the processor is to further execute instructions that anticipate a portion of the defined gesture pattern performed by the target using the first plurality of image frames and at least one previously captured image frame.

7. The device of claim 6, wherein the processor is to further execute instructions that perform gesture recognition on a portion of the first plurality of image frames corresponding to an area where the anticipated portion of the defined gesture pattern is predicted to occur.

8. The device of claim 1, further comprising a display screen, the display screen to output a graphical user interface.

9. The device of claim 8, wherein the processor is to further execute instructions that perform a defined command in response to identification of the defined gesture pattern performed by the target, wherein the defined command causes a change in the graphical user interface.

10. The device of claim 1, wherein the first plurality of image frames includes a background frame of image data and an active frame of image data, and wherein the processor is to further execute instructions that determine a difference between the background frame of image data and the active frame of image data.

11. The device of claim 10, wherein the processor is to further execute instructions that utilize the determined difference between the background frame of image data and the active frame of image data to reduce noise when performing gesture recognition on the first plurality of image frames.

12. The device of claim 1, wherein the processor is to further execute instructions that detect a lack of motion from the first plurality of image frames or the second plurality of image frames, and wherein the digital camera is further to turn off in response to the detection of the lack of motion.

13. A method of processing gesture information, comprising:
    emitting light outside a human-visible spectrum using a light emitting element;
    detecting, using an image sensor including a plurality of image pixel sensor elements disposed in a grid of pixels, light outside the human-visible spectrum emitted from the light emitting element and reflected from a target, wherein the plurality of image pixel sensor elements in the image sensor are capable of detecting light inside the human-visible spectrum and outside the human-visible spectrum;
    generating, using the image sensor, signal data from the plurality of image pixel sensor elements, the signal data including data from the light detected inside the human-visible spectrum and data from the light detected outside the human-visible spectrum;
    capturing, using a digital camera including the image sensor, a set of two-dimensional image data from the signal data generated from the image sensor in a period of time, the set of two-dimensional image data indicating the detected light outside the human-visible spectrum;
    producing a plurality of image frames from the set of two-dimensional image data based at least in part on the detected light outside the human-visible spectrum; and
    performing gesture recognition on at least the plurality of image frames to identify a defined gesture pattern performed by the target.

14. The method of claim 13, further comprising:
    capturing, using the digital camera, a second set of two-dimensional image data from the signal data generated from the image sensor in the period of time, the second set of two-dimensional image data indicating the detected light inside the human-visible spectrum;
    producing a second plurality of image frames from the second set of two-dimensional image data based on the detected light inside the human-visible spectrum;
    processing the plurality of image frames; and
    processing the second plurality of image frames;
    wherein performing gesture recognition on at least the plurality of image frames includes performing gesture recognition based on gestures detected from at least the plurality of image frames and the second plurality of image frames.

15. The method of claim 13, further comprising emitting light outside the human-visible spectrum using a second light emitting element.

16. The method of claim 15, wherein emitting light outside the human-visible spectrum using the light emitting element and emitting light outside the human-visible spectrum using the second light emitting element includes emitting light outside the human-visible spectrum using the light emitting element and the second light emitting element at separate times based on a modulation technique, the modulation technique using at least one of: amplitude modulation, time code modulation, or spatial modulation.

17. The method of claim 13, further comprising anticipating a portion of the defined gesture pattern performed by the target using the plurality of image frames and at least one previously captured image frame.

18. The method of claim 17, further comprising performing gesture recognition on a portion of the plurality of image frames corresponding to an area where the anticipated portion of the defined gesture pattern is predicted to occur.

19. The method of claim 13, further comprising performing a defined command in response to identification of the defined gesture pattern performed by the target, wherein the defined command causes a change in a graphical user interface.

20. The method of claim 13, further comprising determining a difference between a background frame of image data and an active frame of image data, wherein the plurality of image frames includes the background frame of image data and the active frame of image data.

21. The method of claim 20, further comprising, utilizing the determined difference between the background frame of image data and the active frame of image data to reduce noise when performing gesture recognition on the plurality of image frames.

22. The method of claim 13, further comprising detecting a lack of motion from the plurality of image frames or the second plurality of image frames, and turning off the digital camera in response to the detection of the lack of motion.

23. At least one non-transitory machine readable medium including instructions that, when executed by a machine, cause the machine to perform operations that:
    emit light outside a human-visible spectrum using a light emitting element;
    detect, using an image sensor including a plurality of image pixel sensor elements disposed in a grid of pixels, light inside the human-visible spectrum and light outside the human-visible spectrum emitted from the light emitting element and reflected from a target;
    generate, using the image sensor, signal data from the plurality of image pixel sensor elements, the signal data including data from the light detected inside the human-visible spectrum and data from the light detected outside the human-visible spectrum;
    capture, using a digital camera including the image sensor, a first set of two-dimensional image data from the signal data generated from the image sensor in a period of time, the first set of two-dimensional image data indicating the detected light outside the human-visible spectrum;
    capture, using the digital camera including the image sensor, a second set of two-dimensional image data from the signal data generated from the image sensor in the period of time, the second set of two-dimensional image data indicating the detected light inside the human-visible spectrum;
    produce a first plurality of image frames from the first set of two-dimensional image data based at least in part on the detected light outside the human-visible spectrum;
    produce a second plurality of image frames from the second set of two-dimensional image data based on the detected light inside the human-visible spectrum;
    process the first plurality of image frames; and
    perform gesture recognition from at least the first plurality of image frames to identify a defined gesture pattern performed by the target.

24. The machine readable medium of claim 23, the instructions further causing the machine to perform operations that process the second plurality of image frames; and wherein operations to perform gesture recognition from at least the first plurality of image frames include operations to perform gesture recognition from at least the first plurality of image frames and the second plurality of image frames.

25. The machine readable medium of claim 23, the instructions further causing the machine to perform operations that emit light outside the human-visible spectrum using a second light emitting element.

26. The machine readable medium of claim 23, the instructions further causing the machine to perform operations that anticipate a portion of the defined gesture pattern performed by the target using the first plurality of image frames and at least one previously captured image frame.

27. The machine readable medium of claim 26, the instructions further causing the machine to perform operations that perform gesture recognition on a portion of the first plurality of image frames corresponding to an area where the anticipated portion of the defined gesture pattern is predicted to occur.

28. The machine readable medium of claim 23, the instructions further causing the machine to perform operations that perform a defined command in response to identification of the defined gesture pattern performed by the target, wherein the defined command causes a change in a graphical user interface.

* * * * *